United States Patent
Manssour et al.

(10) Patent No.: US 9,794,812 B2
(45) Date of Patent: Oct. 17, 2017

(54) METHODS AND NETWORK NODES FOR DETERMINING AN INDICATION OF INTERFERENCE MITIGATION AND FOR SCHEDULING A TRANSMISSION

(75) Inventors: Jawad Manssour, Seoul (KR); Konstantinos Dimou, San Francisco, CA (US); Kristina Jersenius, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 187 days.

(21) Appl. No.: 14/353,180

(22) PCT Filed: Mar. 1, 2012

(86) PCT No.: PCT/SE2012/050237
§ 371 (c)(1),
(2), (4) Date: Apr. 21, 2014

(87) PCT Pub. No.: WO2013/062460
PCT Pub. Date: May 2, 2013

(65) Prior Publication Data
US 2014/0256336 A1    Sep. 11, 2014

(30) Foreign Application Priority Data
Oct. 26, 2011 (SE) .................. PCT/SE2011/051272

(51) Int. Cl.
*H04B 17/345* (2015.01)
*H04B 17/382* (2015.01)
(Continued)

(52) U.S. Cl.
CPC .......... *H04W 24/08* (2013.01); *H04B 17/345* (2015.01); *H04B 17/382* (2015.01);
(Continued)

(58) Field of Classification Search
CPC ................................. H04W 72/08; H04L 1/06
See application file for complete search history.

(56) References Cited

U.S. PATENT DOCUMENTS

2004/0229571 A1* 11/2004 Ball ...................... H04W 16/14
455/67.11
2004/0259561 A1    12/2004 Stewart et al.
(Continued)

FOREIGN PATENT DOCUMENTS

EP          2180748 A1    4/2010
WO     2008024773 A2    2/2008
(Continued)

OTHER PUBLICATIONS

Qualcomm Europe. "System Operation of SU-MIMO and MU-MIMO." 3GPP TSG-RAN WG1 #46, R1-062043, Tallinn, Estonia, Aug. 28,-Sep. 1, 2006, pp. 1-7.
(Continued)

*Primary Examiner* — Muthuswamy Manoharan
(74) *Attorney, Agent, or Firm* — Patents of Demand P.A.; Brian K. Buchheit

(57) ABSTRACT

A method and a radio network node (110) for scheduling a transmission from the radio network node (110) to a user equipment (120) are provided. The radio network node (110) obtains an indication of interference mitigation in a receiver in the user equipment (120). Next, the radio network node (110) selects a set of radio resources for the transmission based on the indication of interference mitigation, thereby scheduling the transmission.

19 Claims, 7 Drawing Sheets

(51) Int. Cl.
| | |
|---|---|
| *H04W 24/10* | (2009.01) |
| *H04W 24/08* | (2009.01) |
| *H04L 1/00* | (2006.01) |
| *H04W 72/12* | (2009.01) |
| *H04L 1/20* | (2006.01) |
| *H04L 5/00* | (2006.01) |
| *H04W 28/08* | (2009.01) |

(52) U.S. Cl.
CPC .......... *H04L 1/0021* (2013.01); *H04L 1/0026* (2013.01); *H04L 1/20* (2013.01); *H04L 5/0037* (2013.01); *H04W 24/10* (2013.01); *H04W 28/08* (2013.01); *H04W 72/1226* (2013.01)

(56) References Cited

U.S. PATENT DOCUMENTS

| | | | |
|---|---|---|---|
| 2006/0188003 A1 | 8/2006 | Larsson | |
| 2008/0101407 A1 | 5/2008 | Khan et al. | |
| 2008/0261607 A1* | 10/2008 | Craig | H04W 72/082 455/450 |
| 2009/0016263 A1 | 1/2009 | Kishigami et al. | |
| 2011/0136499 A1 | 6/2011 | Miyata | |
| 2014/0126483 A1* | 5/2014 | Novak | H04W 72/048 370/329 |

FOREIGN PATENT DOCUMENTS

| | | |
|---|---|---|
| WO | 2008030806 A2 | 3/2008 |
| WO | 2009011626 A1 | 1/2009 |
| WO | 2009082110 A2 | 7/2009 |
| WO | 2012022037 A1 | 2/2012 |
| WO | 2012037730 A1 | 3/2012 |

OTHER PUBLICATIONS

Samsung. "UE feedback and scheduling considerations for 4-Tx antenna MIMO" 3GPP TSG RAN WG1 Meeting #47, R1-063262, Riga, Latvia, Nov. 6-10, 2006, pp. 1-10.

Pantech & Curitel. "UE selection diversity and SIC gain." 3GPP TSG RAN Working Group 1 Meeting #59, R1-094679, Jeju, Korea, Nov. 9-13, 2009, pp. 1-2.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.3.0, Sep. 1, 2011, pp. 94-95, 3GPP, France.

* cited by examiner

Fig. 1
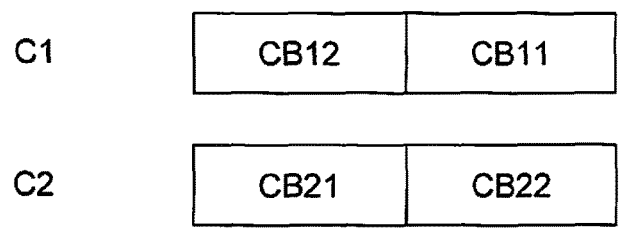
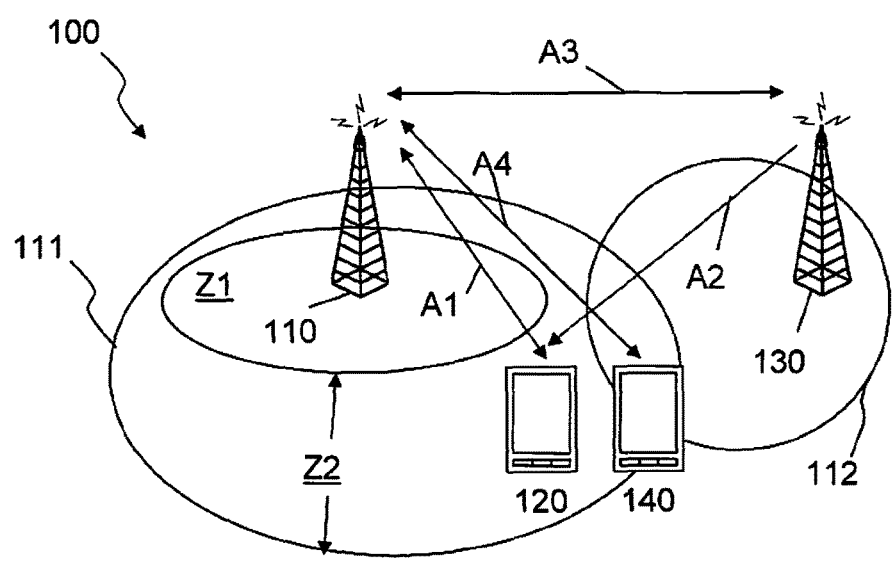
Fig. 2

METHODS AND NETWORK NODES FOR DETERMINING AN INDICATION OF INTERFERENCE MITIGATION AND FOR SCHEDULING A TRANSMISSION

TECHNICAL FIELD

Embodiments herein relate to the field of telecommunication systems. In particular, the embodiments herein relate to a network node and a method therein for determining an indication of interference mitigation in a receiver comprised in a user equipment. Moreover, embodiments herein relate to a radio network node and a method therein for scheduling a transmission from the network node to the user equipment.

BACKGROUND

Performance of many existing wireless systems, such as telecommunication systems or cellular radio communication systems, may be limited by interference from different radio devices, such as radio base stations. To combat effects of this interference, several so called interference mitigation techniques have been proposed.

According to some interference mitigation techniques, the interference mitigation is achieved though receiver design. Receiver design refers to design of a receiver comprised in a user equipment. Such a receiver uses for example interference rejection combining (IRC), successive interference cancellation (SIC) or the like to mitigate interference in a signal received by the receiver.

According to some other interference mitigation techniques, the interference mitigation is performed though radio resource management (RRM). Known RRM schemes for interference mitigation include for example different inter-cell interference coordination (ICIC) scheduling algorithms, employing fractional frequency division and appropriate power control mechanisms.

It should be noted that interference mitigation through receiver design is typically independent whether uplink or downlink is considered. The downlink refers to a signal received by the user equipment and the uplink refers to a signal transmitted by the user equipment. However, the ICIC scheme is different in downlink as compared to uplink, because in the downlink the interference originates from surrounding base stations, whereas in the uplink the interference originates from other surrounding user equipments, i.e. relative locations of user equipments in uplink affects the ICIC scheme resulting in higher other cell interference variance.

A known RRM scheme for interference mitigation, or interference management, is soft frequency reuse. In FIG. 1, a block diagram illustrating soft frequency reuse is shown. According to soft frequency reuse, a base station divides an available scheduling bandwidth, i.e. a certain frequency range, into two or more, not necessarily equal, portions. See portions CB11, CB12, CB21 and CB22 in FIG. 1. For example, a cell-edge portion CB11 of the scheduling bandwidth for a first cell C1 is defined and allocated to cell-edge users and similarly a cell-center portion CB12 of the scheduling bandwidth for the first cell C1 is defined and is allocated to cell-center users. Similarly, a further cell-edge portion CB21 and a further cell-center portion CB22 of the scheduling bandwidth for a second cell C2 are defined. The base station schedules its so called cell-edge users on the cell-edge portion CB11. The cell-edge users are typically located close to, or in the vicinity of, a cell border of the first cell operated by the base station. Thus, the base station transmits at a higher transmit power to ensure proper reception by such cell-edge users, i.e. user equipments at the cell edge. The base station schedules its cell-center users on the cell-center portion CB2. Thus, the base station can transmit at a lower power compared to the higher transmit power for the user equipments at the cell-edge. In order to mitigate interference towards the cell-edge users, the cell-edge portions CB11, CB21 are selected to be non-overlapping in terms of frequency for the first and second cells C1, C2, which typically are neighbouring cells. In this manner, interference from transmissions of the second cell C2, towards a cell-edge user, camping on the first cell C1, will be mitigated. The second cell may be operated by the base station or by a neighbouring base station. As a result, performance in terms of for example throughput will increase for the cell-edge user of cell C1.

A known Long Term Evolution (LTE) system comprises a base station, such as an eNB, utilizing Soft Frequency Reuse (SFR). A first and a second user equipment are served by the base station. The first user equipment comprises an advanced receiver employing IRC or SIC. The second user equipment comprises a receiver without IRC or SIC. Hence, the LTE system comprises user equipments whose receivers are different in terms of interference mitigation. This may cause ambiguity and inefficiencies in the network, i.e. in the LTE system.

SUMMARY

An object is to reduce ambiguity in a radio communication system, such as the LTE system mentioned above.

According to an aspect, the object is achieved by a method in a radio network node for scheduling a transmission from the radio network node to a user equipment. The radio network node obtains an indication of interference mitigation in a receiver in the user equipment. Furthermore, the radio network node selects a set of radio resources for the transmission based on the indication of interference mitigation, thereby scheduling the transmission.

According to another aspect, the object is achieved by a radio network node for scheduling a transmission from the radio network node to a user equipment. The radio network node comprises a processing circuit configured to obtain an indication of interference mitigation in a receiver in the user equipment. Furthermore, the processing circuit is configured to select a set of radio resources for the transmission based on the indication of interference mitigation, thereby scheduling the transmission.

Thanks to that the indication of interference mitigation is taken into account when scheduling the transmission to the user equipment, the scheduling may be done in such a manner that the scheduling is improved. For example, when the indication of interference mitigation indicates that the user equipment has a receiver that is capable of interference mitigation, the radio network node may allocate the transmission to resource blocks which due to interference could not otherwise be used for the transmission.

An advantage is thus that overall system performance may be improved.

BRIEF DESCRIPTION OF THE DRAWINGS

The various aspects of embodiments disclosed herein, including particular features and advantages thereof, will be readily understood from the following detailed description and the accompanying drawings, in which:

FIG. 1 shows a block diagram illustrating soft frequency reuse,

FIG. 2 shows a schematic overview of an exemplifying radio communication system in which exemplifying methods according embodiments herein may be implemented.

DETAILED DESCRIPTION

Figure 3A:
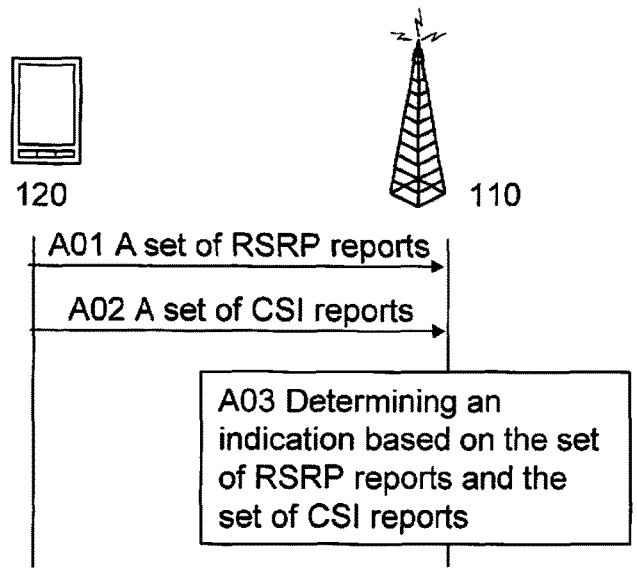
FIG. 3a shows a schematic, combined signalling scheme and flowchart of a first non-limiting exemplifying method performed in the radio communication system according to FIG. 2.

Throughout the following description similar reference numerals have been used to denote similar elements, network nodes, parts, items or features, when applicable. In the Figures, optional features that appear in some embodiments are indicated by dashed lines.

FIG. 2 shows a radio communication system, 100. In this example, the radio communication system 100 is a LTE system. In other examples, the radio communication system may be a Global System for Mobile communications (GSM) system, High Speed Packet Access (HSPA) system, WiMax, or the like.

The radio communication system 100 comprises a network node or a radio network node. In examples, herein, the network node or the radio network node may be a first eNB 110 (evolved-Node B). In other examples, the network node may be a radio network controller (RNC), a base station controller (BSC), a Node B or the like.

The first eNB 110 operates a cell 111. A cell-center portion Z1 of the cell 111 is and a cell-edge portion Z2 of the cell 111.

Furthermore, the radio communication system 100 comprises a second eNB 130. As an example, the second eNB 130 is a neighbour to the first eNB 110. The second eNB 130 operates a further cell 112.

In addition, the radio communication system 100 comprises a user equipment 120. The user equipment 120 is served by the first eNB. In some examples, the user equipment 120 is located in the cell-center portion Z1 of the cell 111.

Moreover, a further user equipment 140, located in the cell-edge portion Z2 of the cell 111, is served by the first eNB 110.

The user equipment 120 and further user equipment 140 may be mobile phones, cellular phones, Personal Digital Assistants (PDA) equipped with radio communication capabilities, smartphones, laptops equipped with an internal or external mobile broadband modem, portable electronic radio communication devices, wireless tablets or the like.

The user equipment 120 and the first eNB 110 are configured to communicate A1 with each other through a radio interface, such as Evolved Universal Terrestrial Radio Access Network (EUTRAN) for LTE.

The user equipment 120 may measure on signals A2 received from the second eNB 130.

The first eNB 110 and the second eNB 130 are configured to communicate A3 with each other through a communication interface, such as X2 in LTE. X2 is known from 3GPP terminology.

The further user equipment 140 and the first eNB 110 are configured to communicate A4 with each other through a radio interface, such as Evolved Universal Terrestrial Radio Access Network (EUTRAN) for LTE.

Figure 3B:
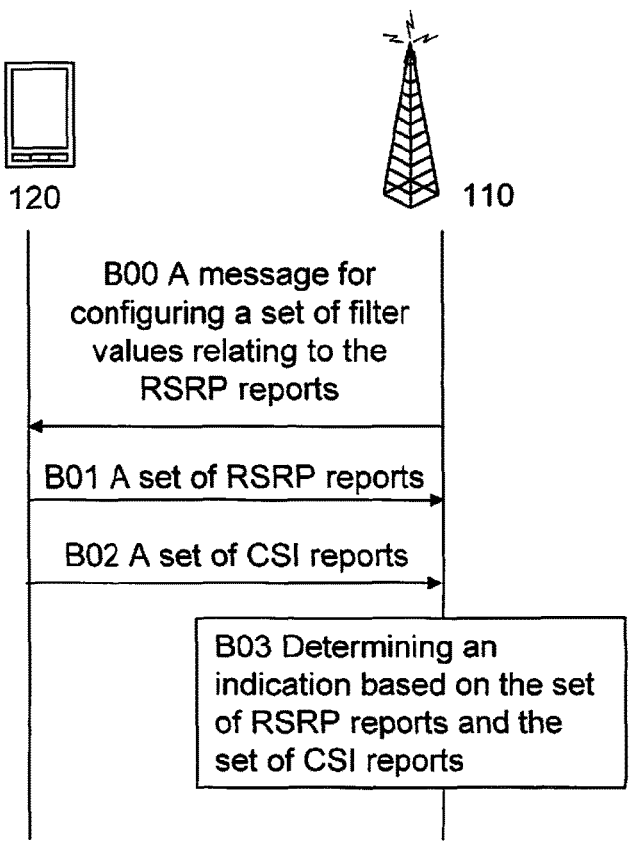
FIG. 3b shows a schematic, combined signalling scheme and flowchart of a second non-limiting exemplifying method performed in the radio communication system according to FIG. 2.

FIG. 3a and FIG. 3b show schematic, combined signalling schemes and flowcharts of exemplifying methods performed in the radio communication system 100. The first eNB 110 performs exemplifying methods for determining the indication of interference mitigation in the receiver comprised in the user equipment 120. The user equipment 120 may be served by the first eNB 110.

It shall be noted that interference mitigation may also be referred to as interference cancellation or interference suppression and it describes any receiver type capable of subtracting, removing, suppressing or minimizing other cell interference and/or out of band emission by means of adequate signal processing.

According to a first non-limiting example, described with reference to FIG. 3a, the first set of measures is a set of RSRP reports and the second set of measures is a set of CSI reports. Thus, an example of a measure of the first set is a RSRP measurement and an example of a measure of the second set is a measurement on which CSI is based. RSRP reports and CSI reports are known from 3GPP terminology.

CSI is calculated, by the user equipment 120, and reported to the first eNB 110 in such a way that the first eNB 110 does not have to be aware of the receiver of the user equipment, i.e. interference cancellation capabilities of the user equipment 120 should be reflected in the reported CSI values. This means that the CSI values are post receiver processing values. On the other hand, RSRP is measured prior to the receiver processing chain, i.e. prior to receiver processing. However, RSRP values are typically filtered in order to mainly reflect slow fading only. Therefore, a direct utilization and a direct comparison between CSI and RSRP are not possible. In the first non-limiting example, it is presented how to determine the indication, or deduce information on interference mitigation, by appositely dealing with this mismatch in filtering.

The following actions are performed. Notably, in some embodiments of the method the order of the actions may differ from what is indicated below.

Action A01

The set of RSRP reports includes RSRP measurements, performed by the user equipment 120, towards a serving cell, e.g., the first eNB 110, and at least one neighbouring cell, e.g. the second eNB 130. It may be noted that the RSRP reports are typically based on measurements of reference signals, such as cell specific reference symbols (CRS). The RSRP reports, indicating signal strength, are obtained prior to processing by the receiver in the user equipment 120.

The user equipment 120 sends the set of RSRP reports and the first eNB 110 receives the set of RSRP reports.

Action A02

The set of CSI reports are generated by the user equipment 120 as is known in the art. The CSI reports, indicating channel quality, are obtained after processing by the receiver of the user equipment 120.

The user equipment 120 sends the set of CSI reports and the first eNB 110 receives the set of CSI reports.

Action A03

The first eNB 110 determines the indication of interference mitigation based on the set of RSRP reports and the set of CSI reports. As an example, the first eNB 110 filters SINR values, obtained by converting CSI values in the CSI reports to said SINR values, over time to obtain a time-filtered SINR, denoted $SINR_{CSI}$. Then, the first eNB 110 compares the time-filtered SINR, $SINR_{CSI}$, to an estimated SINR, denoted $SINR_{RSRP}$, which is calculated based on the RSRP reports as explained in the following.

The RSRP reports, or RSRP measurements, are measurements for RSRP between the user equipment and different cells, i.e. the serving cell and said at least one neighbouring cell. The first eNB 110 uses the RSRP measurements to calculate the estimated SINR, $SINR_{RSRP}$, for the user equipment 120 by dividing the RSRP for the serving cell, denoted $RSRP_{serving\_cell}$, with the RSRPs for non-serving cells, i.e. neighbouring cells. The RSRPs for non-serving cells are denoted $RSRP_{neighbor\_cells}$. In some examples, an assumed noise may be added to the RSRP for non-serving cells, $RSRP_{neighbor\_cells}$. The assumed noise, $L_{assumed\_noise}$, may be calculated using a noise figure which typically may be 9 dB. This calculation is known in the art. The estimated SINR, $SINR_{RSRP}$, should preferably be multiplied by a factor, denoted F, indicating an assumed number of receive antennas of the user equipment 120. In some examples, the factor, F, is reported by the user equipment. Since many user equipments have two receive antennas, a typical value of the factor, F, is two, or 2. The estimated SINR, $SINR_{RSRP}$, is then calculated without applying any interference cancellation algorithm. The following exemplifying equation may be used:

$$SINR_{RSRP}=RSRP_{serving\_cell}/(RSRP_{neighbor\_cells}+L_{assumed\_noise})*F. \quad\quad Eq.\ 1$$

It shall here be noted that the equation is in the linear domain, whereas a value expressed in dB is in the dB-domain (logarithmic domain). Therefore, $RSRP_{serving\_cell}$, $RSRP_{neighbor\_cells}$ and $L_{assumed\_noise}$ should be expressed in Watts (W).

As mentioned above, the time-filtered SINR, $SINR_{CSI}$, is generated by the first eNB 110 based on the CSI reports. The time-filtered SINR, $SINR_{CSI}$, can be compared to the estimated SINR, $SINR_{RSRP}$ after conversion into dB (logarithmic domain).

If the time-filtered SINR, $SINR_{CSI}$, is close to the estimated SINR, $SINR_{RSRP}$, the user equipment 120 does probably not apply any interference cancellation algorithm. Thus, the indication is set accordingly. It is noted here that the estimated SINR, $SINR_{RSRP}$, and the time-filtered SINR, $SINR_{CSI}$, values are close when the absolute difference of these two values is smaller than K dB, where K is in the order of 1-2 dB. If the time-filtered SINR, $SINR_{CSI}$, is significantly larger than the estimated SINR, $SINR_{RSRP}$, it may be a sign of that the user equipment 120 probably is applying an interference cancellation algorithm. Again, the indication shall be set accordingly.

In some examples, the user equipment 120 is located in the cell-edge portion Z2 of the cell. For example the difference between the time-filtered SINR, $SINR_{CSI}$, and the estimated SINR, $SINR_{RSRP}$, for user equipments located in the cell-edge portion Z2 of the cell may be larger than the difference between the time-filtered SINR, $SINR_{CSI}$, and the estimated SINR, $SINR_{RSRP}$, for user equipments located in the cell-center portion Z1, which user equipments are equipped with interference mitigation capable receivers. Hence, in these examples where the user equipment 120 is located in the cell-edge portion Z2 of the cell, the impact of interference mitigation may be larger. As a result, detection of interference mitigation may easier and/or more accurate.

According to a second non-limiting example, described with reference to FIG. 3b, the first set of measures is a set of RSRP reports and the second set of measures is a set of CSI reports as in the first non-limiting example. In the second non-limiting example, there is presented an alternative, or additional, solution for eliminating the mismatch in filtering between CSI and RSRP.

The following actions are performed. Notably, in some embodiments of the method the order of the actions may differ from what is indicated below.

Action B00

The first eNB 110 sends, to the user equipment 120, a message for configuring a set of filter values. The set of filter values relates to how the user equipment 120 performs RSRP measurements. In 3GPP terminology, the set of filter values are referred to as L3 filter values. In order to be able to compare the RSRP reports to the CSI reports, the L3 filter values shall be chosen such that filtering of RSRP measurements over time does not take place. This message may be sent to the user equipment 120 only once, i.e. the message configures the RSRP measurements once per each user equipment. Namely, the first eNB 110 requests user equipments 120 entering its, i.e. the first eNB's, coverage area and having an RSRP from the serving cell below a threshold value, denoted $RSRP_{Threshold}$, to report an event E2. When the event E2 is reported, it means that the RSRP of the UE to its serving cell is worse than a threshold value $RSRP_{Threshold}$.

If the threshold value $RSRP_{Threshold}$ for event E2 is set at a high value, it would trigger a high number of measurements reporting event E2. Hence, even user equipments not located at the cell-edge area of the cell can report RSRP and CSI values and interference cancellation capabilities, or interference mitigation capabilities, in the receiver may be detected, or determined also for those user equipments.

In case an operator is concerned about the amount of signalling created due to RSRP and CSI reports, the operator can set the threshold value for the event E2 at the same value as for the threshold used for separating cell-edge to non-cell-edge user equipments. In this case, only user equipments located in the cell-edge zone, or cell-edge portion, report RSRP and CSI. Once the user equipment capability in mitigating interference is assessed, the first eNB 110 can modify the threshold for reporting of the event E2, or simply it can change the measurement configuration so as user equipments do not report E2. The same applies to the L3 filter values, or layer 3 filtering parameters. They can be set to the normal layer 3 filtering parameters after the indication has been determined.

Action B01

Now that the message has configured the RSRP reports in action B00, this action, i.e. action B01, is performed as in the first non-limiting example. Thanks to the message in action B00, the first eNB 110 has requested the user equipment 120 to report CSI for the time instants, such as subframes, for which RSRP measurements are done without filtering over time. A number of measurement reports relating to RSRP and CSI can be used so as to perform comparisons between these values and estimate the indication of interference mitigation in the receiver of the user equipment, or the user equipment receiver.

The user equipment 120 sends and the first eNB 110 receives the set of RSPR reports. Again, it may be noted that the RSRP reports have been performed without filtering over time.

Action B02

The user equipment 120 sends the set of CSI reports and the first eNB 110 receives the set of CSI reports.

Action B03

The first eNB 110 determines the indication of interference mitigation based on the set of RSRP reports and the set of CSI reports.

In more detail, the above mentioned Eq. 1 may be used to obtain the indication of interference mitigation. Notably, in this example, both CSI and RSRP are not time filtered, thereby, allowing a comparison between CSI and RSRP for a certain time instant.

The method according to the second non-limiting example may be more accurate than the method according to the first non-limiting example. Moreover, the method according to the second non-limiting example yields some additional signalling, i.e. due to the message for configuring L3 filter values, as compared to the method according to the first non-limiting example.

Now returning to the block diagram illustrated in FIG. 1, soft frequency reuse is depicted. Soft frequency reuse is a known RRM scheme. Soft frequency reuse is executed by a base station, such as the first eNB, for mitigating interference. The block diagram illustrates an exemplifying way of dividing a scheduling bandwidth into cell-edge portions CB11, CB21 and cell-center portions CB12, CB22 for the first and second cells C1, C2, respectively. As discussed in the background section, a radio communication system employing an interference management technique, such as soft frequency reuse, may suffer from one or more disadvantages. Especially, the following disadvantages have been identified in case the radio communication system comprises user equipments being different from each other in terms of what type of receiver is comprised in the user equipment. Herein, different type of receiver refers to the receiver's capability of mitigating interference.

A disadvantage is that frequency diversity for user equipments is decreased even though user equipments, having receivers utilizing IRC, SIC or the like, would tolerate more interference. These user equipments need not be confined to the cell-edge portion CB11 when being served by the first cell C1. Similarly, these user equipments need not be confined to the cell-edge portion CB21 when being served by the second cell C2.

Another disadvantage is that scheduling performed by the first eNB 110 is less flexible. In the presence of many cell-edge user equipments per cell, and given that the cell-edge band typically represents 1/3 of the scheduling bandwidth, the cell-edge band may easily be fully allocated by data to receive, i.e. some data may need to be scheduled to a subsequent scheduling interval, such as a subsequent subframe. The ratio 1/3 relates to that the scheduling bandwidth typically is divided by three base stations being neighbours to each other.

Figure 3C:
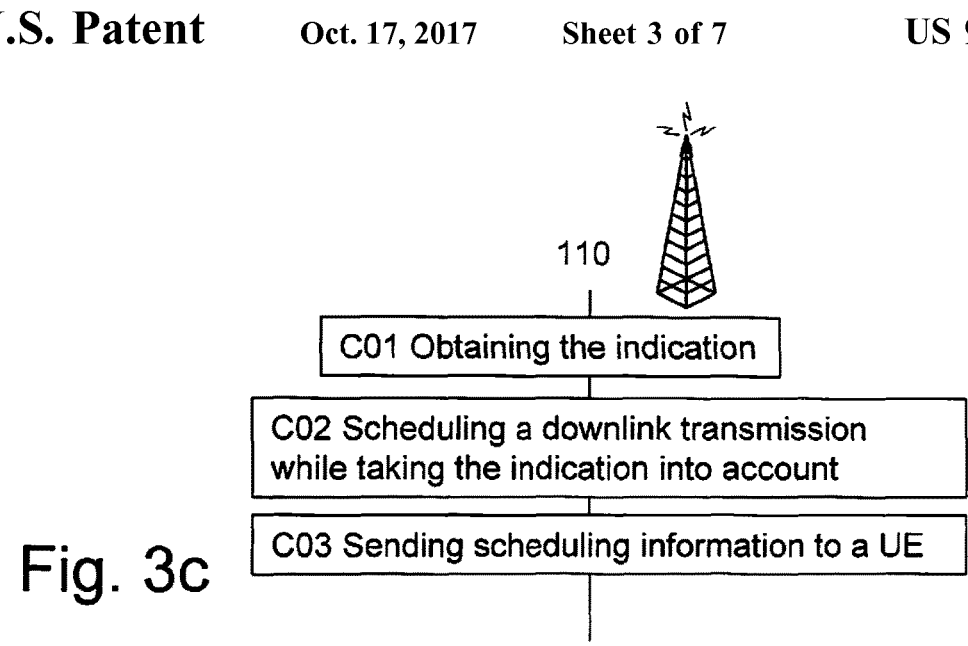
FIG. 3c shows a schematic flowchart of a non-limiting exemplifying method performed in the network node shown in FIG. 2.

In a further non-limiting example, with reference to FIG. 3c, there is presented how to overcome the above mentioned disadvantages.

The following actions may be performed.

Action C01

The first eNB obtains the indication by means of any one of the methods presented as the first and second non-limiting example. In any of the manners described as the first and second non-limiting example, the first eNB 110 is able to determine the indication of interference mitigation. It is from here on, within this example, assumed that the indication indicates that the user equipment 120 comprises a receiver which performs interference mitigation, such as IRC or SIC. Thus, this action corresponds to actions A01, A02, A03, B01, B02 and/or B03.

As an alternative to, or an addition to, the methods presented as the first and second non-limiting example, the first eNB 110 may request the user equipment 120 to report its receiver capability. The receiver capability may be reported by means of the indication of interference mitigation. Different values of the indication may be designated to SIC, IRC and the like, respectively. Alternatively, the indication may represent a level of interference mitigation performed by the receiver of the user equipment 120.

Action C02

The first eNB 110 uses the indication for managing radio resources handled by the first eNB 110. As an example, the first eNB 110 schedules a downlink transmission to the user equipment 120 while taking the indication into account.

This may for example mean that, the first eNB 110 allows the user equipment 120 to be scheduled in any portion of the scheduling bandwidth even if the user equipment 120 has been identified, by the first eNB 110, as being a cell-edge user.

In case frequency diversity for the user equipment 120 needs to be improved, e.g. increased, the possibility to schedule the user equipment 120 in any portion of the scheduling bandwidth allows for use of a wider frequency range. Thus, providing means for increasing frequency diversity for the user equipment 120. As a result, the above mentioned disadvantage of lost frequency diversity is mitigated.

In case there is a shortage of radio resources in the cell-edge portion, the possibility to schedule the user equipment 120 in any portion of the scheduling bandwidth increases the amount of radio resources available to cell-edge users which need to be confined to the cell-edge portion. Typically, users, or rather user equipments, that need to be confined to the cell-edge portion do not perform interference mitigation. Thereby, the above mentioned disadvantage of less flexible scheduling is overcome.

To conclude this further non-limiting example, the first eNB 110, in particular, the scheduler of the first eNB 110, is able to exploit information about the type of receiver, such as the indication of interference mitigation, for scheduling and/or interference mitigation purposes. Having the information about the type of receiver, or information about user equipment receiver capabilities, the first eNB 110 is able to use this as an input when scheduling the user equipment 120. For instance, if the user equipment 120 is known to have an interference-mitigating receiver, it will be able to tolerate and handle higher interference compared to other user equipments. This means that the user equipment 120 with interference-mitigating receiver does not need to be limited to the cell-edge band of the spectrum, e.g. the scheduling bandwidth, even though it has a low RSRP. Such an approach will then allow for more freedom and frequency diversity for the user equipment 120, while at the same time freeing up more radio resources in the cell-edge band for users, e.g. user equipments, that have a low RSRP and comprise conventional receivers, i.e. no IRC or SIC. When the needed cell-edge band per cell is not high, this has the main advantage of making it much simpler for different cells to perform ICIC. Therefore, efficiency of scheduling performed by the first eNB 110 may be improved.

Figure 8:
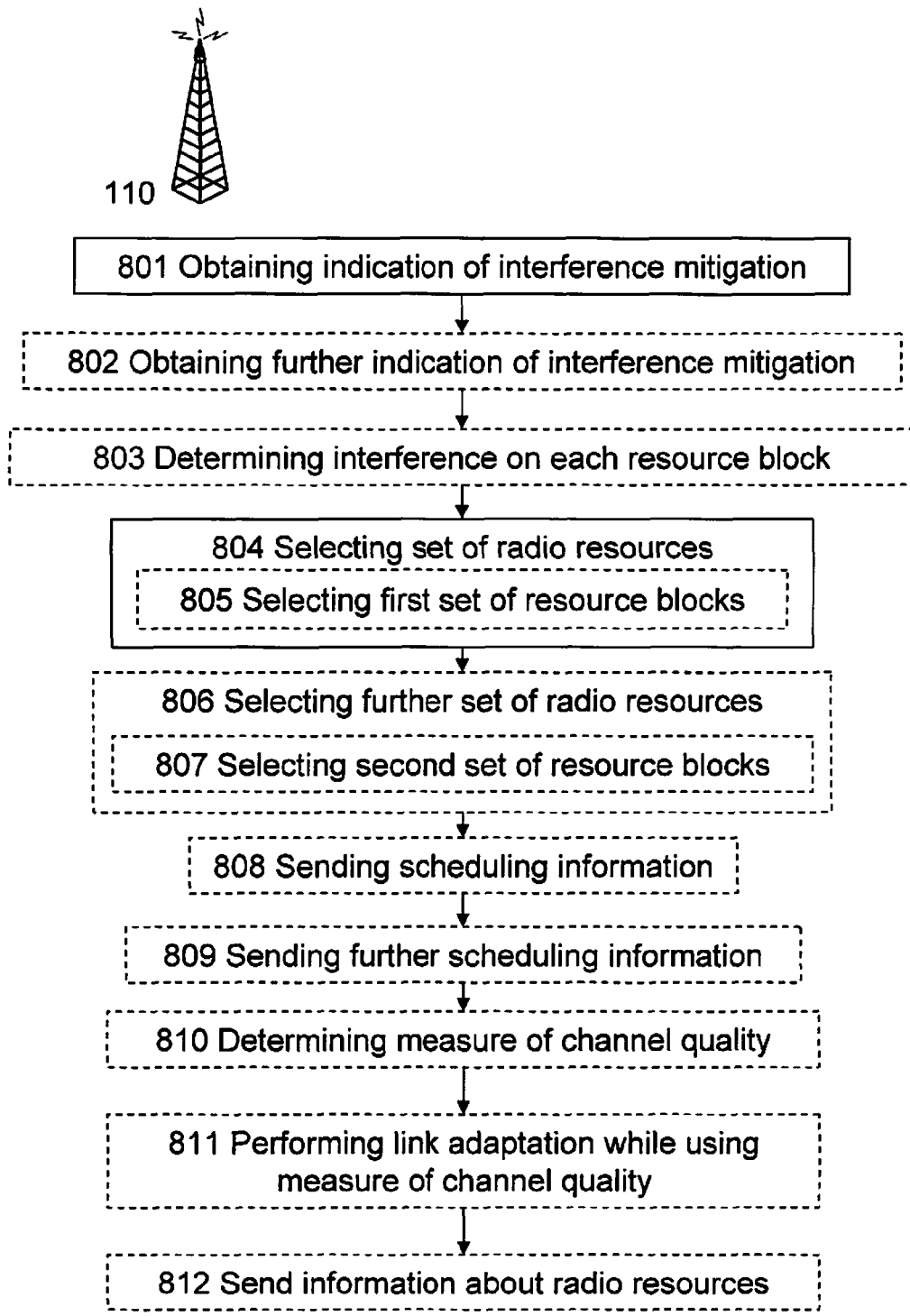
FIG. 8 shows a schematic flowchart of another method in the network node.

A more detailed description of the scheduling will be provided in conjunction with FIG. 8.

Action C03

The first eNB 110 sends scheduling information to the user equipment 120. In this manner, the user equipment 120 is instructed by the first eNB 100 to receive as determined by the scheduling information, which is determined while taking the indication into account. The scheduling information may be a downlink assignment.

An advantage is that frequency diversity for user equipments is increased by allowing user equipments, having receivers utilizing IRC, SIC or the like, to be allocated to any portion of the first cell C1, i.e. both the cell-edge portion and the cell-center portion. Similarly, these user equipments need not be confined to the cell-edge portion CB21 when being served by the second cell C2.

Another advantage is that scheduling performed by the first eNB 110 is more flexible. In the presence of many cell-edge user equipments per cell, and given that the cell-edge portion typically represents 1/3 of the scheduling bandwidth, the cell-edge band may easily be fully allocated by data to receive. However, the scheduler may take advantage of the knowledge about interference mitigation user equipments with receivers utilizing IRC, SIC or the like, and accordingly the scheduler schedules such user equipments to the cell-center portion if the cell-edge portion is fully allocated.

Advantages of the further non-limiting example include, some of which has been mentioned above:
  More flexibility and simplicity in the scheduler of the first eNB since user equipments with interference-mitigating receivers can cope with interference without special help from RRM schemes.
  Higher frequency diversity and potentially less delay for user equipments with interference-mitigating receivers as these do not need to be confined to the cell-edge band, or cell-edge portion, of the spectrum.
  Potentially more spectrum available for cell-edge users that do not have interference-mitigating receivers.
  Simpler ICIC as cell-edge user equipments with interference-mitigating receivers do not need to be scheduled in the cell-edge band, leading to an easier coordination between different cells.

Figure 3D:
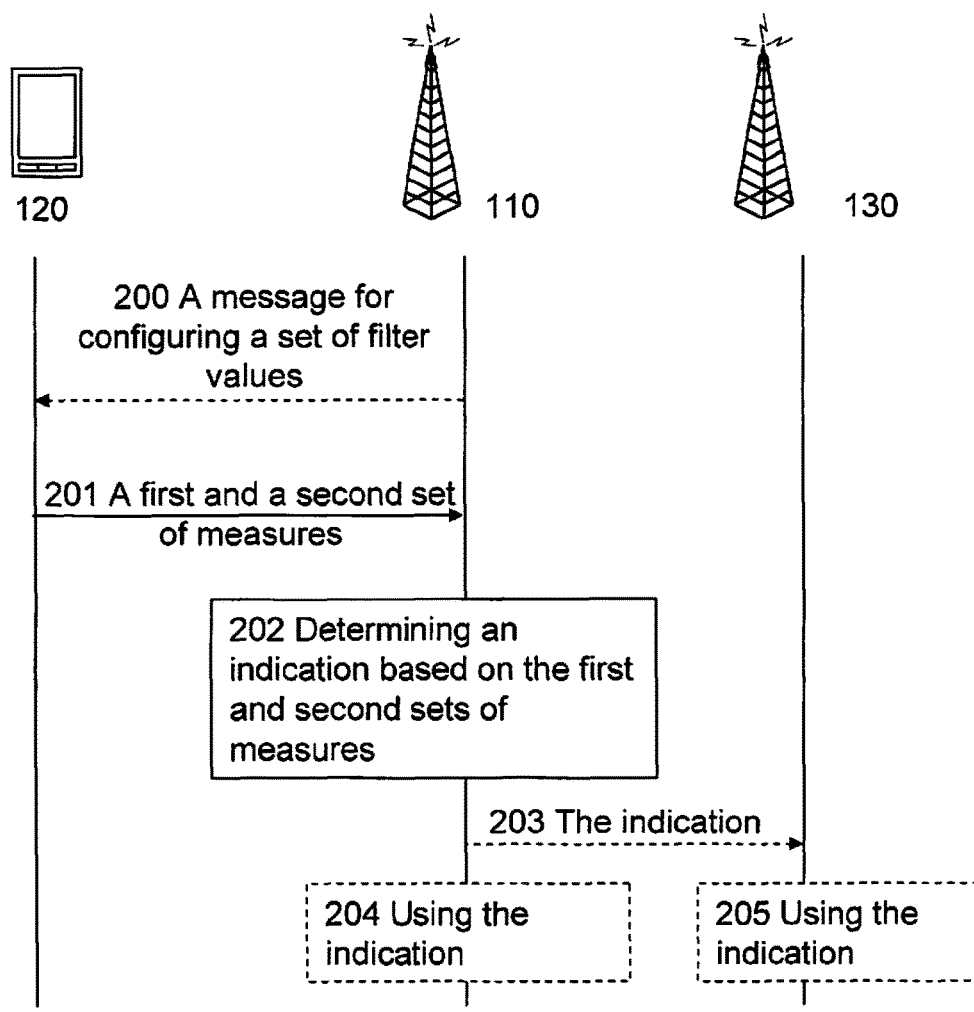
FIG. 3d shows a schematic, combined signalling and flowchart of the exemplifying methods performed in the radio communication system according to FIG. 2.

Now continuing with a more general description of the exemplifying methods indicated by the schematic, combined signalling scheme and flowchart of FIG. 3*d*, in which the network node 110 performs exemplifying methods for determining the indication of interference mitigation in the receiver comprised in the user equipment 120. The user equipment 120 may be served by the first eNB 110.

In some embodiments, the network node 110 is an evolved-NodeB (eNB).

In some embodiments, the first and second sets of measures comprise one or more measures. Each measure corresponds to a measurement towards the network node 110 or a network node neighbouring to the network node 110.

In some embodiments, the first set of measures comprises reference signal received power, reference signal received quality or received signal strength, and the second set of measures comprises, or is based on, channel state information (CSI) or channel quality indicator (CQI). In more detail, the second set of measures is a set of SINR values obtained by converting the CSI to SINR values.

In some embodiments, the user equipment 120 is located in a cell edge zone of a cell operated by the network node 110.

In some embodiments, the network node 110 operates in one of the following modes, or transmission modes: open loop Multiple-Input-Multiple-Output (MIMO) transmission mode, single antenna transmit mode, and transmit diversity mode. Thus, according to these embodiments, it is avoided that precoding gain used for example with closed-loop MIMO is included in the time-filtered CSI, denoted SINR_CSI. Precoding gain is not used with any of the aforementioned modes of transmission. Therefore, when the first eNB 110 is requesting the user equipment 120 to measure CSI and RSRP such as to assess, or determine, the indication, aka the existence or level of IC capability in the user equipment 120, the first eNB 110 transmits by applying one of the transmission modes mentioned above: single antenna, transmit diversity, or open loop MIMO mode.

It may be noted that the user equipment's receiver type, such as a receiver employing SIC or IRC, is an intrinsic characteristic of the hardware comprised in the user equipment. Therefore, it is sufficient for the first eNB 110 to estimate the indication once, i.e. estimate the receiver type. Furthermore, it is sensible to assume that the first eNB 110 can estimate whether the user equipment 120 has a receiver capable of mitigation interference or not when the first eNB 110 is not using a closed loop MIMO transmission mode. The interference mitigation performed by the user equipment may in some occasions be switched on or off. This could lead to errors if the determining of the indication is performed when the interference mitigation is switched off. However, the time instants during which the interference mitigation may be switched off are typically time instants with low data rates to the user equipment. Hence, the first eNB 110 is aware of these time instants and performs the determination of the indication accordingly.

For the purpose of completeness, it may be said that IRC is a technique that requires multiple antennas at the receiver and consists of choosing the receiver parameters based not only on the desired signal's channel, i.e. as done conventionally in e.g. maximum ratio combining (MRC), but also on the covariance matrix of noise plus interference or the covariance matrix of interference.

Moreover, SIC is a technique that also requires multiple antennas at the receiver and typically consists of an iterative approach of e.g. removing an estimated value of an interfering signal from a total received signal plus interference, before making an attempt at decoding the desired signal.

One or more of the following actions may be performed. Notably, in some embodiments of the method the order of the actions may differ from what is indicated below.

Action 200

This action corresponds to action B00.

The network node 110 sends, to the user equipment 120, a message for configuring a set of filter values.

Action 201

This action corresponds to action A01, A02, B01 and/or B02.

The network node 110 receives and the user equipment 120 sends a first set of measures and a second set of measures. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

The expressions "processing of the signal in the receiver", "receiver processing" and the like are interchangeably used. These expressions shall be understood to include any processing, performed by the receiver, whose purpose is to improve quality of the received signal. Such processing includes filtering, cancelling, mitigating, minimizing or subtracting of inference, noise and the like.

Action 202

This action corresponds to action A03, B03 and/or C01.

The network node 110 determines the indication of interference mitigation based on the first and second sets of measures. In some examples, the network node 110 determines the receiver type based on the first and second sets of measures.

In some embodiments, the determining 202 comprises setting the indication based on a difference between a first value indicating signal quality of the received signal and a second value indicating signal quality of the received signal, the first value is based on the first set of measures and the second value is based on the second set of measures. As an example, the indication may indicate a level, or a amount, of interference mitigation. The level may be expressed in dB.

In some embodiments, the determining 202 is performed by comparing the difference to a threshold value, such as 1-2 dB. Theoretically, when the difference is greater than zero, it is assumed that the user equipment comprises a receiver with interference mitigation capability, such as SIC or IRC. However, due to estimation errors and the like, the threshold can be set to 1-2 dB, or slightly higher if the network wants to have a clear indication of interference mitigation mechanism within a given user equipment. Furthermore, the difference reflects the level of interference mitigation required in order to consider it worthwhile to have an impact on for example scheduling. A high threshold value, such as 6 dB, may lead to that some user equipments erroneously are considered to lack interference mitigation capabilities. Furthermore, the network node 110 performs a first action of setting the indication to indicate that interference mitigation is performed by the receiver when the difference is greater than the threshold value, or a second action of setting the indication to indicate that interference mitigation is non-existent in the receiver when the difference is less than the threshold value. As an example, the indication may in this embodiment indicate existence of interference mitigation in the receiver.

In some embodiments, the first value is calculated by means of the first set of measures when the first set of measures was measured by the user equipment 120 while filtering over a first time period. The first time period may comprise a plurality of time frames, such as subframes. The second value is obtained by filtering, by the network node 110, the second set of measures over a second time period. A second distance in time between the second time period and the first time period is less than a second threshold value. As an example, the second threshold value may be set such that the second time period at least partly overlaps with the first time period. The second time period may comprise a plurality of time frames, such as subframes. It may be preferred that the first and second time periods are the same time period. In this manner, accuracy of the difference between the first and second values may be improved as compared to when the first time period and second time period is only slightly overlapping, or even not overlapping at all. Each measure of the second set corresponds to a corresponding time frame of the second time period. As an example, each CSI report corresponds to, or is obtained during, a subframe within the second time period.

In some embodiments of the method, the first value is a signal-to-interference-and-noise-ratio or a signal-to-interference-ratio. These embodiments correspond to the first non-limiting example above.

In some embodiments, the first value is calculated by means of the first set of measures when each measure of the first set of measures was measured by the user equipment 120 during a first time frame. The first set of measures was measured during the time frame no filtering over a plurality of time frames takes place. The second value is based on the second set of measures. The second set of measures was measured by the user equipment 120 during a second time frame. A first distance in time between the first time frame and the second time frame is less than a first threshold value.

As an example, the first and second time frames may be subframes known from 3GPP terminology. It may be preferred that the first and second time frames are the same time frame. In this manner, accuracy of the different between the first and second values may be improved as compared to when different time frames are used for the first and second set of measures, respectively.

In other examples, the first time frame and the second time frame may be comprised in a range of time frames, such as 10 subframes. In these examples, the measurements, pertaining to the first and second sets, may originate from different subframes among those subframes comprised in the time frame. These examples allow more flexible measurements, since the first time frame and the second time frame only are required to be within the range mentioned above. The range provides a margin, such as the first threshold, for a distance in time between the first and second time frames. As above, the first threshold may be set such that the first distance in time is less than 10 subframes.

In some embodiments, the first value is a signal-to-interference-and-noise-ratio calculated by means of the first set of measures or a signal-to-interference-ratio calculated by means of the first set of measures. These embodiments correspond to the second non-limiting example above.

Action 203

In some embodiments, the network node sends the indication to a network node neighbouring to the network node 110. The network node neighbouring to the network node 110 may be the second eNB 130. In this manner, exchange of information about the user equipment 120 as indicated by the indication between the first and second eNBs 110, 130 are provided. The information may be exchanged via the communicating interface X2 or S1.

In examples, the indication is expressed as the receiver type, the network node 110 sends the receiver type to the network node neighbouring to the network node 110, such as the second eNB 130.

Action 204

In some embodiments, the network node 110 uses the indication, such as the receiver type, for managing radio resources handled by the network node 110. Expressed differently, the network node 110 considers the indication, such as the receiver type, when managing radio resources.

The use of the indication comprises one or more of:

Scheduling a downlink transmission to the user equipment, 120 while taking the indication into account, Sending a message, to the user equipment 120, the message instructs the user equipment to perform or not to perform interference mitigation, e.g. switch on or off interference mitigation capability, Balancing load on the network node 110 while taking the indication into account, and Selecting a cell selection offset while taking the indication into account.

As an example, load balancing can be achieved by setting the appropriate cell selection offset.

A highly loaded macro cell can make the decision for moving user equipments at the cell edges to the extended cell range of neighbour pico cells, if those user equipments can support interference mitigation of cell reference signal transmissions from neighbouring cells. Otherwise, if it is not very likely that the user equipment supports the interference mitigation of cell reference signal transmissions from neighbouring cells, this user equipment will not be able to decode PDCCH from the pico, and it will be probably heavily interfered. The macro cell can then instead make the decision, not to move the user equipment to the extended cell range of neighbour pico cells.

Another example, where this knowledge of interference mitigation of a user equipment is used so as to set appropriately cell selection offset, is in case of homogeneous networks, or in general when the neighbour cells are of the same size, e.g. macro cells. Consider the following scenario. The serving macro cell A is low loaded and a given user equipment has reported better RSRP from the neighbour macro cell B. In normal circumstances the user equipment should have been moved from cell A to cell B. However, cell B is heavily loaded. In case this present user equipment supports interference mitigation, it can remain in cell A, since cell A can handle interference from cell B and other neighbours. In case, a second user equipment is in a similar location or position but does not support interference mitigation, then the macro cell A hands over this second user equipment to macro neighbour cell B.

Action 205

The second eNB 130 uses the indication for managing radio resources handled by the second eNB 130. This action is similar to action 204, but here in action 205 the second eNB manages the radio resources while taking the indication, such as the receiver type, into consideration.

The use of the indication may comprise one or more of:

Scheduling a downlink transmission to the user equipment 120 while taking the indication into account, Sending a message, to the user equipment 120, the message instructs the user equipment to perform or not to perform interference mitigation, e.g. switch on or off interference mitigation capability, Balancing load on the network node 110 while taking the indication into account, and Selecting a cell selection offset while taking the indication into account.

As an example, the indication may be transmitted to the second eNB 130 along with the physical resource blocks which are granted to the user equipment. Neighbouring base stations, such as the second eNB 130, may use this information when setting transmit power, or transmission power, on these designated physical resource blocks. For example, the transmit power may be increased on the designated physical resource blocks when the user equipment 120 comprises a receiver employing IRC or SIC as indicated by the indication.

Figure 4:
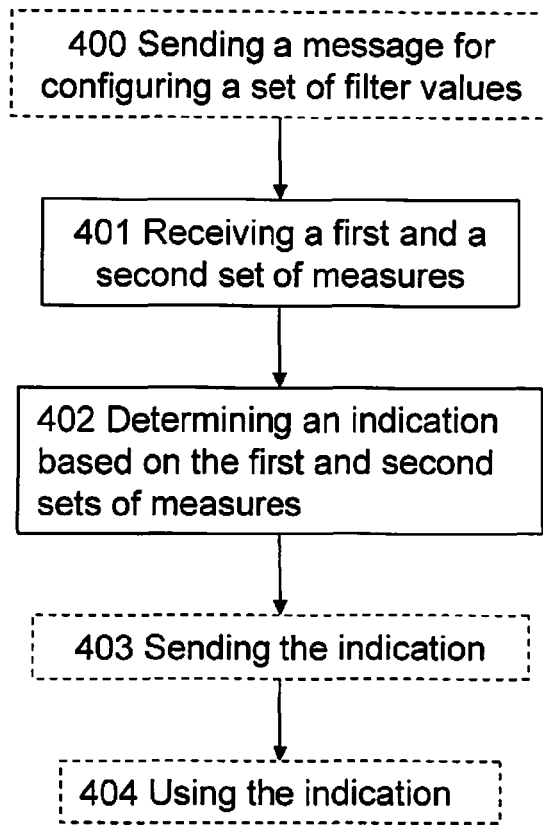
FIG. 4 shows a schematic flowchart of the methods of FIG. 3a-3d when seen from the network node.

In FIG. 4, an exemplifying, schematic flowchart of the methods of FIG. 3a-3d, when seen from the network node 110, is shown. The network node 110 may be the first eNB 110 in FIG. 2. The network node 110 performs exemplifying methods for determining the indication of interference mitigation in the receiver comprised in the user equipment 120.

One or more of the following actions may be performed. Notably, in some embodiments of the method the order of the actions may differ from what is indicated below.

Action 400

This action corresponds to action 200.

The network node 110 sends, to the user equipment 120, a message for configuring a set of filter values.

Action 401

This action corresponds to action 201.

The network node 110 receives a first set of measures and a second set of measures from the user equipment 120. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

Action 402

This action corresponds to action 202.

The network node 110 determines the indication of interference mitigation based on the first and second sets of measures.

In some embodiments, the determining 202 comprises setting the indication based on a difference between a first value indicating signal quality of the received signal and a second value indicating signal quality of the received signal, the first value is based on the first set of measures and the second value is based on the second set of measures. As an example, the indication may indicate a level, or a amount, of interference mitigation. The level may be expressed in dB.

In some embodiments, the determining 202 is performed by comparing the difference to a threshold value, such as 1-2 dB. Theoretically, when the difference is greater than zero, it is assumed that the user equipment comprises a receiver with interference mitigation capability, such as SIC or IRC. However, due to estimation errors and the like, the threshold can be set to 1-2 dB. Furthermore, the difference reflects the level of interference mitigation required in order to consider it worthwhile to have an impact on for example scheduling. A high threshold value, such as 6 dB, may lead to that some user equipments erroneously are considered to lack interference mitigation capabilities. Furthermore, the network node 110 performs a first action of setting the indication to indicate that interference mitigation is performed by the receiver when the difference is greater than the threshold value, or a second action of setting the indication to indicate that interference mitigation is non-existent in the receiver when the difference is less than the threshold value. As an example, the indication may in this embodiment indicate existence of interference mitigation in the receiver.

In some embodiments, the first value is calculated by means of the first set of measures when the first set of measures was measured by the user equipment 120 while filtering over a first time period. The second value is obtained by filtering, by the network node 110, the second set of measures over a second time period. A second distance in time between the second time period and the first time period is less than a second threshold value. Each measure of the second set corresponds to a corresponding time frame of the second time period. In some embodiments of the method, the first value is a signal-to-interference-and-noise-ratio or a signal-to-interference-ratio. These embodiments correspond to the first non-limiting example above.

In some embodiments, the first value is calculated by means of the first set of measures when each measure of the first set of measures was measured by the user equipment 120 during a first time frame. Since the first set of measures was measured during the time frame no filtering over a plurality of time frames takes place. The second value is based on the second set of measures. The second set of measures was measured by the user equipment 120 during a second time frame. A first distance in time between the first time frame and the second time frame is less than a first threshold value. In some embodiments, the first value is a signal-to-interference-and-noise-ratio calculated by means of the first set of measures or a signal-to-interference-ratio calculated by means of the first set of measures. These embodiments correspond to the second non-limiting example above.

Action 403

This action corresponds to action 203.

In some embodiments, the network node sends the indication to a network node neighbouring to the network node 110. The network node neighbouring to the network node 110 may be the second eNB 130. In this manner, exchange of information about the user equipment 120 as indicated by the indication between the first and second eNBs 110, 130 are provided. The information may be exchanged via the communicating interface X2 or S1.

Action 404

This action corresponds to action 204.

In some embodiments, the network node 110 uses the indication for managing radio resources handled by the network node 110.

The use of the indication comprises one or more of:
  Scheduling a downlink transmission to the user equipment 120 while taking the indication into account,
  Sending a message, to the user equipment 120, the message instructs the user equipment to perform or not to perform interference mitigation, e.g. switch on or off interference mitigation capability,
  Balancing load on the network node 110 while taking the indication into account, and
  Selecting a cell selection offset while taking the indication into account.

As an example, load balancing can be achieved by setting the appropriate cell selection offset.

A highly loaded macro cell makes the decision for moving user equipments at the cell edges to the extended cell range of neighbour pico cells, if those user equipments can support interference mitigation of cell reference signal (CRS) transmissions from neighbouring cells. Otherwise, if the user equipment does not support interference mitigation of CRS transmissions from neighbouring cells very likely, this user equipment will not be able to decode PDCCH from the pico, and it will be probably heavily interfered.

Another example where this knowledge of IC capability of a user equipment is used so as to set appropriately cell selection offset is in case of homogeneous networks, or in general when the neighbour cells are of the same size, e.g. macro cells. Consider the following scenario. The serving macro cell A is low loaded and a given user equipment has reportedly better RSRP from the neighbour macro cell B. In normal circumstances the user equipment should have been moved from cell A to cell B. However, cell B is heavily loaded. In case this present user equipment supports IC, it can remain in cell A, since it can handle interference from cell B and other neighbours. In case, a second user equipment is in similar location/position but does not support IC, then the macro cell A hands over this second user equipment to macro neighbour cell B.

Figure 5:
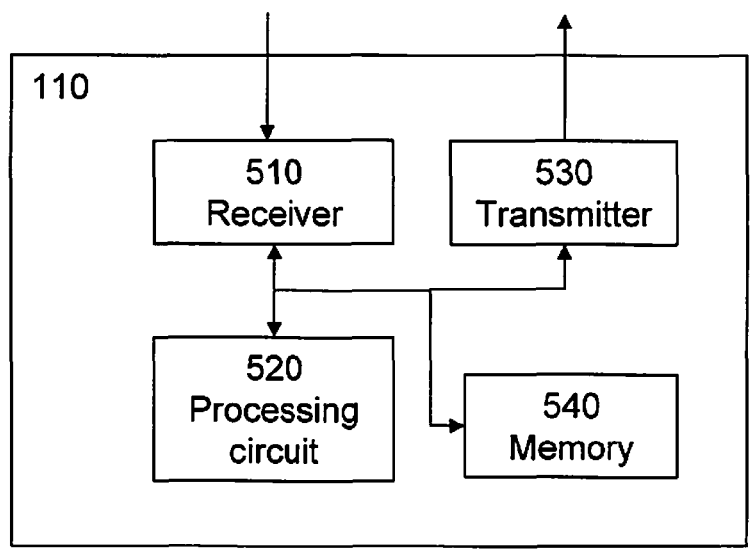
FIG. 5 shows a schematic block diagram of an exemplifying network node configured to perform the methods illustrated in FIG. 4.

With reference to FIG. 5, a schematic block diagram of the network node 110, such as the first eNB 110, is shown. The network node 110 is configured to perform the methods in FIGS. 4a and 4b. The network node 110 is configured to determine the indication of interference mitigation in the receiver comprised in the user equipment 120.

The network node 110 comprises a receiver 510 configured to receive, from the user equipment 120, a first set of measures and a second set of measures. The first set of measures relates to a signal received by the user equipment 120 and the second set of measures relates to the same signal. The first set of measures was obtained by the user equipment 120 prior to processing of the signal in the receiver and the second set of measures was obtained by the user equipment 120 after processing of the signal in the receiver.

Furthermore, the network node 110 comprises a processing circuit 520 configured to determine the indication of interference mitigation based on the first and second sets of measures.

In some embodiments, the processing circuit 520 further is configured to set the indication based on a difference between a first value indicating signal quality of the received signal and a second value indicating signal quality of the received signal, the first value is based on the first set of measures and the second value is based on the second set of measures.

In some embodiments, the processing circuit 520 further is configured to compare the difference to a threshold value. Moreover, the processing circuit 520 is configured to perform one of:
  setting the indication to indicate that interference mitigation is performed by the receiver when the difference is greater than the threshold value, and
  setting the indication to indicate that interference mitigation is non-existent in the receiver when the difference is less than the threshold value.

In some embodiments of the network node 110, the processing circuit 520 further is configured to calculate the first value by means of the first set of measures when each measure of the first set of measures was measured by the user equipment 120 during a first time frame, and to determine the second value based on the second set of measures. The second set of measures was measured by the user equipment 120 during a second time frame as the first set of measures was measured. A first distance in time between the first time frame and the second time frame is less than a first threshold value.

In some embodiments, the first value is a signal-to-interference-and-noise-ratio calculated by means of the first set of measures or a signal-to-interference-ratio calculated by means of the first set of measures.

In some embodiments of the network node 110, the processing circuit 520 further is configured to calculate the first value by means of the first set of measures when the first set of measures was measured by the user equipment 120 while filtering over a first time period, and to obtain the second value by filtering, by the network node 110, the second set of measures over a second time period. A second distance in time between the second time period and the first time period is less than a second threshold value. Each measure of the second set corresponds to a corresponding time frame of the second time period.

In some embodiments, the first value is a signal-to-interference-and-noise-ratio or a signal-to-interference-ratio.

In some embodiments, the processing circuit 520 further is configured to use the indication for managing radio resources handled by the network node 110, the use of the indication is performed by one or more of:
- Scheduling a downlink transmission to the user equipment 120 while taking the indication into account,
- Sending a message, to the user equipment 120, the message instructs the user equipment to perform or not to perform interference mitigation,
- Balancing load on the network node 110 while taking the indication into account, and
- Selecting a cell selection offset while taking the indication into account.

The processing circuit 520 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the network node 110 further comprises a transmitter 530 configured to send the indication to a network node neighbouring to the network node 110 or to send a scheduling grant to the user equipment 120.

In some embodiments, the radio network node 110 may further comprise a memory 540 for storing software to be executed by, for example, the processing circuit. The software may comprise instructions to enable the processing circuit to perform the method in the network node 110 as described above in conjunction with FIG. 4. The memory 540 may be a hard disk, a magnetic storage medium, a portable computer diskette or disc, flash memory, random access memory (RAM) or the like. Furthermore, the memory may be an internal register memory of a processor.

Figure 6:
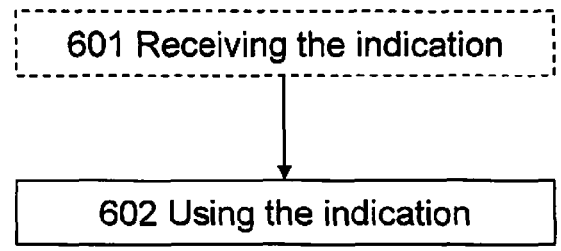
FIG. 6 shows a schematic flowchart of the methods of FIG. 3a-3d when seen from the second eNB.

In FIG. 6, an exemplifying, schematic flowchart of the methods of FIG. 3a-3d, when seen from the network node neighbouring to the network node 110, is shown. The network node neighbouring to the network node 110 may be the second eNB 130 in FIG. 2. The second eNB 130 may perform a method for obtaining the indication of interference mitigation in a receiver comprised in a user equipment 120. The user equipment 120 is served by the network node 110. The network node 110 and the second eNB 130 are comprised in the cellular radio communication system 100.

The following actions are performed.

Action 601

This action corresponds to action 203.

In some embodiments, the network node neighbouring to the network node 110 receives the indication. The network node neighbouring to the network node 110 may be the second eNB 130. In this manner, exchange of information about the user equipment 120 as indicated by the indication between the first and second eNBs 110, 130 are provided. The information may be exchanged via the communicating interface X2 or S1.

Action 602

This action corresponds to action 205.

The second eNB 130, as an example of the network node neighbouring to the network node 110, uses the indication for managing radio resources handled by the second eNB 130.

The use of the indication may comprise one or more of:
- Scheduling a downlink transmission to the user equipment 120 while taking the indication into account,
- Sending a message, to the user equipment 120, the message instructs the user equipment to perform or not to perform interference mitigation, e.g. switch on or off interference mitigation capability,
- Balancing load on the network node 110 while taking the indication into account, and
- Selecting a cell selection offset while taking the indication into account.

As an example, the indication may be transmitted to the second eNB 130 along with the physical resource blocks which are granted to the user equipment. Neighbouring base stations, such as the second eNB 130, may use this information when setting transmit power, or transmission power, on these designated physical resource blocks. For example, the transmit power may be increased on the designated physical resource blocks when the user equipment 120 comprises a receiver employing IRC or SIC as indicated by the indication.

Figure 7:
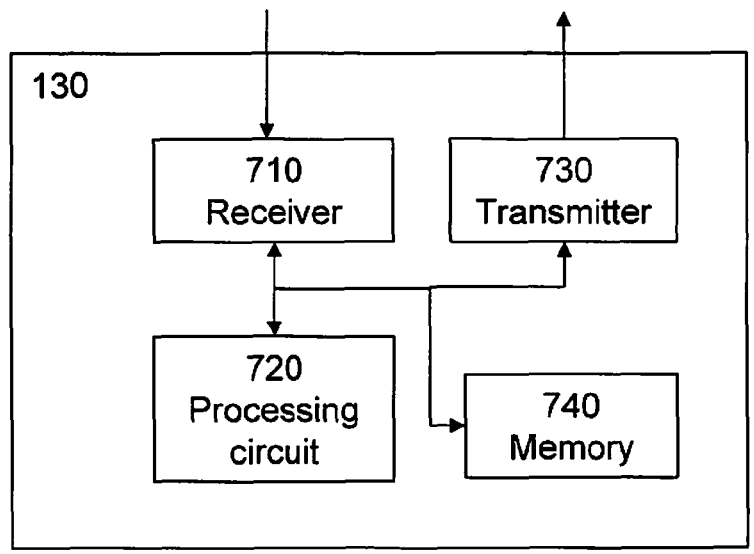
FIG. 7 shows a schematic block diagram of an exemplifying network node neighbouring to the network node configured to perform the methods illustrated in FIG. 6.

With reference to FIG. 7, a schematic block diagram of the second eNB 130 is shown. The second eNB is an example of the network node 130 neighbouring to the network node 110. The second eNB is configured to obtain the indication of interference mitigation in a receiver comprised in the user equipment 120. As mentioned above, the user equipment 120 is configured to be served by the network node 110.

The second eNB 130 comprises a receiver 710 configured to receive the indication of interference mitigation from the network node 110.

The second eNB 130 further comprises a processing circuit 720 configured to use the indication for managing radio resources handled by the second eNB 130. In this manner, the second eNB 130 may adapt its radio resource handling while taking the indication into account similarly to the first eNB 110. As an example, the second eNB 130 can transmit with high/max power to user equipments at the cell edges with the cell controlled by eNB 110. In case the second eNB 130 is aware of that all of UEs at the cell edges of the eNB 110, e.g. being a macro eNB, can cancel interference and vice versa if those user equipments can not cancel interference.

The processing circuit 720 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the second eNB 130 may comprise a transmitter 730 configured to transmit messages in conjunction with using of the indication. Typically, the processing circuit 720 uses the indication as exemplified above and the transmitter 730 transmits as configured by the processing circuit 720.

In some embodiments, the second eNB 130 may further comprise a memory 740 for storing software to be executed by, for example, the processing circuit. The software may comprise instructions to enable the processing circuit to perform the method in the second eNB 130 as described above in conjunction with FIG. 6. The memory may be a hard disk, a magnetic storage medium, a portable computer diskette or disc, flash memory, random access memory (RAM) or the like. Furthermore, the memory may be an internal register memory of a processor.

In for example action C02 in FIG. 3c, it is indicated that the indication may be used to improve scheduling. With reference to FIG. 8, it will now be described how to take further advantage of the indication of interference mitigation for scheduling purposes. In an exemplifying scenario, the radio communication system 100 is radio resource limited. The radio communication system 100 is radio resource limited when there is more data available for transmission to the user equipment 120 and/or the further user equipment 140 than may be sent, by the eNB 110, on radio resources available for use by the user equipment 120. As shall be understood from the following, a special scheduling policy may be applied to user equipments with IC capabilities such as to make radio resources, e.g. resource blocks, available for allocation to other user equipments which are not capable of IC. If or when the special scheduling policy is not applied, these radio resources would be allocated to the user equipment with IC capabilities.

In FIG. 8, a schematic flowchart of another exemplifying method in the first eNB 110 is shown. In this example, the eNB 110 performs a method for scheduling a transmission from the eNB 110 to the user equipment 120.

The method comprises the following actions. The actions may be performed in any suitable order.

In the following, the eNB 110 will be referred to as the radio network node 110.

Action 801

The radio network node 110 obtains an indication of interference mitigation in a receiver in the user equipment 120. In this manner, the radio network node 110 is made aware of the indication of interference mitigation. The indication may be used by the radio network node 110 for different purposes, such as improving scheduling. The scheduling may be improved by providing equal data rate to different users, increased user throughput, increased cell throughput or other depending on the applied scheduling policy. As indicated by action 802, the radio network node 110 may obtain indications of interference mitigation for any user equipment served by the radio network node.

The indication of interference mitigation may be obtained, by e.g. reporting, estimation or determination, as described above in for example action C01.

When the indication is reported, the indication of interference mitigation may be reported by and received from the user equipment 120. This is possible provided that the user equipment 120 is capable of reporting the indication of interference mitigation to the radio network node 110.

Furthermore, in some embodiments the indication is determined, which possibly may be a complement to the reporting of the indication. In these embodiments, the radio network node 110 receives a first set of measures and a second set of measures from the user equipment 120. Again, the first set of measures relates to a signal received by the user equipment 120 and the second set of measures relates to the same signal. As mentioned, the first set of measures was obtained by the user equipment 120 prior to processing of the signal in the receiver, and the second set of measures was obtained by the user equipment 120 after processing of the signal in the receiver. The radio network node 110 may then determine the indication of interference mitigation based on the first and second sets of measures.

Action 802

The radio network node 110 may obtain a further indication of interference mitigation in a receiver in the further user equipment 140. The further indication of interference mitigation may be used in action 807. In action 807. the radio network node 110 may determine which one of the user equipment 120 and the further user equipment 140 that has greater capability of mitigation interference. Therefore, this action is performed before action 807.

Action 803

The radio network node 110 may determine interference on each resource block of a plurality of resource blocks. The determined interference on said each resource blocks, e.g. level of interference, may be used to select those resource blocks which are interfered by the second eNB 130 to such an extent that the first threshold value is exceeded. It may be preferred that this action is performed when subsequent action 805 is to be performed. Therefore, this action may be performed when the indication of interference mitigation is above a first threshold value for interference mitigation.

The determined interference may relate to other cell interference in some cases. In these case or in other cases, the determined interference may relate to out of band emission. Typically, there may be interfering out of band emission on a portion of a downlink frequency, such as a downlink carrier. Then, the radio network node 110 may schedule the user equipments with IC capabilities on these portions that have higher out of band emission than other portions. It shall also be understood that other interference scenarios may occur. The embodiments described herein may be applicable to these other interference scenarios as well.

The interference may be determined based on various measurement reports received from the user equipment. The user equipment may perform measurements on various signals from the second eNB 130. The various signals may be reference signals, pilot signals or any other signal which is known to the user equipment. In this manner, interference from the second eNB 130 to the user equipment is measured and reported by the user equipment to the radio network node 110.

Action 804

The radio network node 110 selects a set of radio resources for the transmission based on the indication of interference mitigation, thereby scheduling the transmission. In this manner, the indication of interference mitigation is taken into account when the radio network node 110 schedules the transmission to the user equipment 120.

Action 805

This action further exemplifies what action(s) the user equipment 120 performs in action 804 when action 803 has been performed. Hence, the selection of the set of radio resources may be performed by selecting a first set of resource blocks out of the plurality of resource blocks based on the interference determined in action 803. This action may be performed when the indication of interference mitigation is above a first threshold value for interference mitigation. That is to say, the user equipment 120 is capable of mitigating interference. The first set of resource blocks are comprised in the set of radio resources in this action.

In some examples, the plurality of resource blocks may be classified into groups of high or low interference resource blocks depending on the first threshold value. In further examples, multiple thresholds may be used. In this manner, the plurality of resource blocks may be classified into for example high, medium or low interference resource blocks. Resource blocks that are not classified may be considered to have negligible interference with respect to the first threshold value. As mentioned above, the user equipment is capable of mitigating interference. Therefore, the user equipment 120 may be scheduled on resource blocks where other cell interference is considered to be high, or even the highest in some cases.

The interference on said each resource block of the first set of resource blocks may be above a second threshold value for interference. Then, these resource blocks may be classified as high, medium or low interference resource blocks depending on the second threshold value.

Moreover, the second threshold value may dependent on the indication of interference mitigation for the user equipment 120. In this manner, the second threshold value is adapted to the indication of interference mitigation for the user equipment 120. As an example, the indication of interference mitigation may indicate that the user equipment 120 has greater capability of mitigating interference than the further user equipment 140. Consequently, the user equipment 120 is capable of tolerating higher interference than the further user equipment 140. Therefore, the second threshold value may be higher when classifying resource blocks in view of the user equipment 120 than when classifying resource blocks in view of the further user equipment 140.

Action 806

The radio network node 110 may select a further set of radio resources for a further transmission based on the further indication of interference mitigation. In this manner, scheduling of the further transmission to the further user equipment 140 is performed while taking the further indication into account.

Action 807

When the indication of interference mitigation is greater than the further indication of interference mitigation, the radio network node 110 may select the further set of radio resources by selecting a second set of resource blocks out of the plurality of resource blocks based on the further indication of interference mitigation. The second set of resource blocks is comprised in the further set of radio resources. The second set of resource blocks comprises resource blocks for which each of the determined interference is less than each of the determined interference of the first set of resource blocks.

As indicated by that the indication of interference mitigation is greater than the further indication of interference mitigation, the user equipment 120 has higher interference cancellation capabilities than the further user equipment 140. Therefore, as mentioned differently above, the user equipment 120 with higher interference cancellation capabilities than the further user equipment 140 is allocated to resource blocks with higher interference and the less interfered resource blocks are allocated to the further user equipment 140. The resource blocks with higher interference may e.g. be the first set of resource blocks. The less interfered resource blocks may e.g. be the second set of resource blocks.

Action 808

The radio network node 110 may send scheduling information indicating the set of radio resources to the user equipment 120. In this manner, for example a downlink assignment is sent to the user equipment 120 such that the user equipment 120 becomes aware of how, when and where the transmission is to be received from the radio network node 110.

Action 809

The radio network node 110 may send further scheduling information indicating the further set of radio resources to the further user equipment 140. Similarly to action 808, in this manner, for example a downlink assignment is sent to the further user equipment 140 such that the further user equipment 140 becomes aware of how, when and where the transmission is to be received from the radio network node 110.

Action 810

The radio network node 110 may determine a measure of channel quality based on the indication of interference mitigation. In this manner, the indication of interference mitigation is used to adjust the channel quality on which link adaption is based as described in action 811. In some examples, the measure of channel quality may be SINR, where a revised SINR may be equal to the sum of a previous SINR and the indication of interference mitigation when expressed as a value in dB.

Action 811

The radio network node 110 may perform link adaptation based on the measure of channel quality. This action will be further elaborated with reference to FIG. 9.

According to some embodiments, the radio communication system 100 utilizes RRM ICIC techniques, such as Fractional Frequency Reuse (FFR) and Soft Frequency Reuse (SFR), for cells 111, 112 operated by the first and second eNB 110, 130. In these embodiments, action 801-811 are performed without any limitation implied by the RRM ICIC technique of the radio communication system 100, even though the radio communication system 100 utilizes for example FFR/SFR. Hence, for example resource blocks available for scheduling are not confined to resource blocks in the cell edge band when the user equipment 120 is located in the cell edge of the first eNB 110.

In examples where RRM ICIC techniques are applied, cell edge user equipments are considered. A reason for this is that interference mitigation is of less importance, or urgency, for cell center user equipments. That is mainly related to the following two reasons:

The user equipments in the cell center Z1 do not suffer considerably from other cell interference. For example due to larger path loss from the interferers towards these cell center user equipments. Hence, no specific action needs to be taken for them in this respect.

Interference mitigation structures at the receiver are not efficient in cancelling/removing/minimizing the low amount of other cell interference experienced by the cell center user equipments as the interference may be seen as a white noise instead of as a strong interferer.

It is noted here that other cell interference estimation within a given resource block, or physical resource block, may be performed by appropriate processing of RSRP and/or Received Signal Strength Indicator (RSSI) and/or Received Signal Reference Quality (RSRQ) measurements.

Action 12

This action is performed when the radio communication system 100 implements FFR/SFR.

When the user equipment 120 is located at the cell edge Z2 of the first eNB 110 and the downlink transmission has been allocated to physical resource blocks (PRBs) that are not in the cell edge band of the first eNB 110, the downlink transmission may, unexpectedly, generate interference towards the further user equipment 140, served by the second eNB 130. The further user equipment is located at the cell edge of the second eNB 130 and transmission thereto are allocated to PRBs in the cell edge band of the second eNB. These PRBs may conflict with the PRBs allocated to the downlink transmission. Therefore, the first eNB 110 sends information about radio resources, such as Tx power, PRBs, Transport Block Size (TBS), etc, allocated to the downlink transmission, to the second eNB 130. The notification may be an RNTP indicator as described in TS36.423 transmitted over X2 interface, where the X2 interface is known from 3GPP terminology. Advantageously, for example the second eNB 130 may take the information about allocated radio resources, such as reduced/increased transmission power of the first eNB 110, into account in its own interference management procedures.

Figure 9:
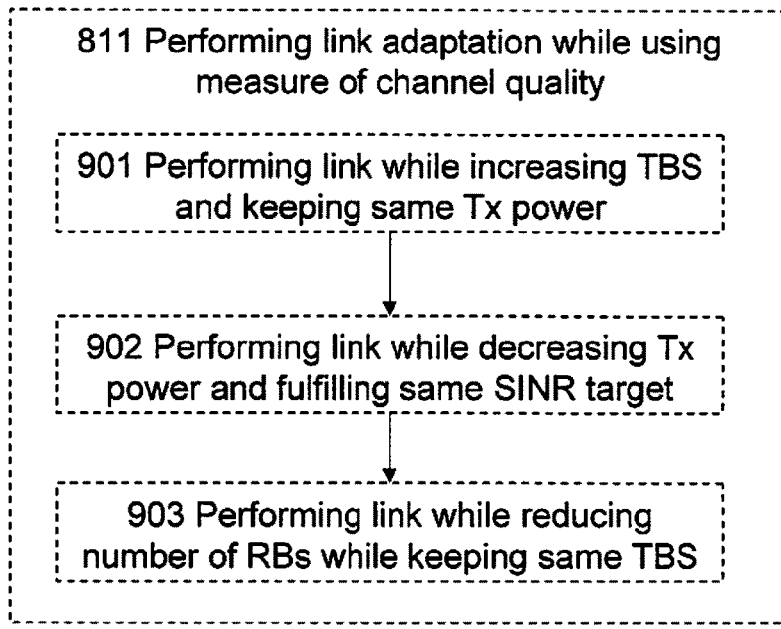
FIG. 9 shows a schematic flowchart of an exemplifying method performed in the network node according to FIG. 8.

Now turning to FIG. 9, an exemplifying flow chart of three embodiments, which further describes action 811 of FIG. 8, is shown. According to these embodiments, link adaptation is performed while taking the indication of interference mitigation into account. In this manner, further advantages by use of the indication of interference mitigation for the user equipment 120 may be obtained.

In these embodiments, the radio communication system 100 is aware of the receiver type of the user equipment 120, in some places referred to as UE Rx type. The receiver type may be given by the indication of interference mitigation. Therefore, a scheduler, comprised in the first eNB 110, is able to use the receiver type as input when applying scheduling policies. The scheduling policies may aim at increasing, or even maximizing, cell throughput, user equipment throughput, fairness or a combination thereof. Fairness may be understood as relating to data rates of user equipments, number of resource blocks for user equipments, prioritizing Voice over Internet Protocol (VoIP) over data. In this manner, e.g. quality of service (QoS) may be taken into account. As an example, it may be said to be fair when each user equipment connected to the eNB 110 obtains the same data rate or the same number of resource blocks. As another example, it may be said to be fair when a VoIP user equipment sending/receiving VoIP is prioritized over a data user equipment sending/receiving data for transferring e.g. a file or the like. The prioritization may be that the VoIP user equipment obtains higher data rate and/or greater number of resource blocks than the data user equipment.

Scheduling policies which consider the UE Rx type are devised for the general case, i.e. whether ICIC techniques based on FFR or SFR are applied in the system or not. In addition, the scheduling policy described aims at defining the scheduling policy to be applied to user equipments with IC (interference cancellation) capable receivers.

The following three embodiments may be implemented when the first eNB 110 of FIG. 1 does or does not apply interference management techniques, such as RRM ICIC, in the cell.

Action 901

According to prior art, CQI for upcoming Transmission Time Interval (TTI) for the user equipment 120 is known to the first eNB 110. The upcoming TTI is the TTI to which the downlink transmission is to be scheduled. This known CQI will be referred to as "the old CQI".

The old CQI is adjusted to an adjusted CQI, where the adjusted CQI indicates better radio channel conditions for the TTI than the old CQI. This is possible to do since the user equipment with IC capable receiver may tolerate higher interference than without a IC capable receiver. The old CQI may be adjusted, iteratively or non-iteratively, in one or more of the following manner:

The new CQI may be stepwise increased until link adaption would require higher Tx power given same TBS.

The new CQI may be set (based on IC gain and other cell interference on the relevant PRB) under the constraint that link adaption may yield an increased TBS but the same Tx power. Expressed somewhat differently, the first eNB 110 determines a new CQI based on IC gain and interference on the selected PRBs such that link adaption may yield an increased TBS while keeping the Tx power.

By use of the adjusted CQI, it is evaluated whether or not it is possible to increase the TBS while keeping the same Tx power (for each of the selected resource blocks). Expressed differently, link adaptation as known in the art is performed with the adjusted CQI.

If the TBS has been increased, a new modulation and coding scheme may be determined while taking the increased TBS into account (as well as other parameters as known in the art).

In other examples, the measure of channel quality may be SINR. Then the adjusted SINR may be the sum of an old SINR and the indication expressed in dB.

This action corresponds to action 810.

Action 902

In this example, the granted data rate (i.e. amount of data as given by the transport block size) to the user equipment with the IC capable receiver is not modified.

A reason for not modifying the allocated data rate, or the transport block size, allocated to the user equipment 120 is that the packet arrival rate for this specific UE might be of such a nature which results into a situation where the allocated data rate (TBS) to this UE cannot be increased; in such a case the transmission power required so as to meet this SINR requirement is estimated accordingly.

Another reason for not modifying the allocated data rate allocated to the user equipment 120 is that the scheduling policy favours fairness in terms of equal data rate to many user equipments rather than a high data rate to an individual user equipment, such as the user equipment 120 in FIG. 2. Hence, it is the first eNB 110, or in fact the scheduler comprised therein, that decides to increase the transport block size if the indication of interference mitigation so permits.

As an alternative or complement to action 901, the first eNB 110 may decrease the Tx power for the selected resource blocks while still fulfilling an S(I)NR-target.

The Tx power may be decreased with the indication (if expressed in dB, possibly the indication may first be deceased with some margin to be on the safe side).

Next, if needed, modulation and coding scheme (MCS) may be updated according to the adjusted Tx power. This can be done for UEs with transmission modes (TM) TM7/TM8/TM9, which are known from 3GPP terminology, without any RRC reconfiguration (such as updating of MCS). User equipments with other transmission modes will need a RRC reconfiguration, unless Quadrature Phase Shift Keying (QPSK) modulation was utilized Action 903

As an alternative or complement to action 901 and/or 902, it is here described how fewer resource blocks (i.e. fewer resource blocks than the selected resource blocks) may be allocated to the user equipment 120 and the TBS is kept constant (or only slightly increased).

Given the initially determined MCS and the TBS, the downlink transmission is re-allocated to a new number of resource blocks, i.e. as many of the selected resource blocks as needed. In case, the new number of resource blocks is not less than the number of the selected resource blocks, the downlink transmission may be re-allocated with a new slightly increased TBS.

The examples in action 901-903 may also be combined to form yet further examples, in which for example the gain from IC capabilities of the user equipment may be distributed among reduction of number of resource blocks and increase of transport block size while the transmission power is kept constant. In other examples, the gain from IC capabilities of the user equipment may be distributed among decrease of transmission power and increase of number of resource blocks while keeping the SINR-target constant.

Returning to FIG. 5, the network node 110 may according to some embodiments further be configured to improve scheduling as described in the following. In more detail, the receiver 510, the processing circuit 520 and the transmitter 530 may be configured as explained in the following in these embodiments.

The receiver 510 may be configured to receive the indication of interference mitigation from the user equipment 120.

Alternatively, the receiver 510 may be configured to receive, from the user equipment 120, a first set of measures and a second set of measures, wherein the first set of measures relates to a signal received by the user equipment 120 and the second set of measures relates to the same signal, wherein the first set of measures was obtained by the user equipment 120 prior to processing of the signal in the receiver, and wherein the second set of measures was obtained by the user equipment 120 after processing of the signal in the receiver, and wherein the processing circuit 520 further is configured to determine the indication of interference mitigation based on the first and second sets of measures.

In these embodiments, the processing circuit 520 is configured to obtain an indication of interference mitigation in a receiver in the user equipment 120. The processing circuit 520 is further configured to select a set of radio resources for the transmission based on the indication of interference mitigation, thereby scheduling the transmission.

The processing circuit 520 may further be configured to determine interference on each resource block of a plurality of resource blocks. When the indication of interference mitigation is above a first threshold value for interference mitigation, processing circuit 520 may further be configured to select a first set of resource blocks out of the plurality of resource blocks based on the determined interference. The first set of resource blocks is comprised in the set of radio resources.

The processing circuit 520 may be configured to determine a measure of channel quality based on the indication of interference mitigation. The processing circuit 520 may further be configured to perform link adaptation based on the measure of channel quality. The processing circuit 520 may further be configured to obtain a further indication of interference mitigation in a further receiver in a further user equipment 140. The processing circuit 520 may further be configured to select, based on the further indication of interference mitigation, a further set of radio resources for a further transmission from the radio base station 110 to the further user equipment 140.

In some embodiments, the indication of interference mitigation is greater than the further indication of interference mitigation. Then, the processing circuit 520 further is configured to select a second set of resource blocks out of the plurality of resource blocks based on the further indication of interference mitigation. The second set of resource blocks is comprised in the further set of radio resources and the second set of resource blocks comprises resource blocks for which each of the determined interference is less than each of the determined interference of the first set of resource blocks.

The transmitter 530 may further be configured to send scheduling information indicating the further set of radio resources to the further user equipment 140. The transmitter 530 may further be configured to send scheduling information indicating the set of radio resources to the user equipment 120.

The interference on said each resource block of the first set of resource blocks is above a second threshold value for interference. The second threshold value is dependent on the indication of interference mitigation for the user equipment 120.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a radio network node, for scheduling a transmission from the radio network node to a user equipment, the method comprising:
   obtaining, by the radio network node, an indication of interference mitigation in a receiver comprised in the user equipment, wherein the indication is indicative of a level of interference mitigation, and;
   determining, by the radio network node, whether the indication of interference mitigation is above a first threshold value for interference mitigation;
   determining, by the radio network node, a level of interference on each of a plurality of radio resources;
   obtaining, from the user equipment, a first set of measures and a second set of measures, wherein the first set of measures relates to a signal received by the user equipment and the second set of measures relates to the same signal, wherein the first set of measures is obtained by the user equipment prior to processing of the signal in the receiver, and wherein the second set of measures is obtained by the user equipment after processing of the signal in the receiver;
   determining the indication of interference mitigation based on the first set of measure and the second set of measure;
   selecting, by the radio network node, a first set of radio resources, from amongst the plurality of radio resources, for the transmission based on the determination whether the indication of interference mitigation in the receiver is above the first threshold value and the level of interference on each of the plurality of radio resources;
   scheduling the transmission; and
   selecting a second set of radio resources from amongst the plurality of radio resources based on the indication of interference mitigation;
   wherein the second set of radio resources comprises resources for which each of the determined interference is less than each of the determined interference of the first set of radio resources.

2. The method of claim 1, wherein the interference on the each radio resource of the plurality of radio resources is above a second threshold value for interference.

3. The method of claim 2, wherein the second threshold value is dependent on the indication of interference mitigation.

4. The method of claim 1, further comprising determining a measure of channel quality based on the indication of interference mitigation.

5. The method of claim 4, further comprising performing link adaptation based on the measure of channel quality.

6. The method of claim 1, further comprising:
   obtaining a further indication of interference mitigation in a further receiver of a further user equipment;
   selecting, based on the further indication of interference mitigation, a further set of radio resources, from amongst the plurality of radio resources, for a further transmission from the radio base station to the further user equipment; and sending further scheduling information indicating the further set of radio resources to the further user equipment.

7. The method of claim 6:
wherein the indication of interference mitigation is greater than the further indication of interference mitigation.

8. The method of claim 1, further comprising sending scheduling information indicating the first set of radio resources to the user equipment.

9. The method of claim 1, wherein the obtaining the indication of interference mitigation comprises either:
obtaining the indication of interference mitigation from the user equipment.

10. A radio network node for scheduling a transmission from the radio network node to a user equipment, the radio network node comprising:
a processing circuit configured to:
obtain an indication of interference mitigation in a receiver comprised in the user equipment, wherein the indication of interference mitigation is greater than the further indication of interference mitigation obtained from a further receiver in a further user equipment, and wherein the indication is indicative of a level of interference mitigation, and;
determine whether the indication of interference mitigation is above a first threshold value for interference mitigation;
determine a level of interference on each of a plurality of radio resources;
obtain, from the user equipment, a first set of measures and a second set of measures, wherein the first set of measures relates to a signal received by the user equipment and the second set of measures relates to the same signal, wherein the first set of measures is obtained by the user equipment prior to processing of the signal in the receiver, and wherein the second set of measures is obtained by the user equipment after processing of the signal in the receiver;
determining the indication of interference mitigation based on the first set of measure and the second set of measure; and
select a first set of radio resources, from amongst the plurality of radio resources, for the transmission based on the determination whether the indication of interference mitigation in the receiver is above the first threshold value and the level of interference on each of the plurality of radio resources, thereby scheduling the transmission, selecting a second set of radio resources from amongst the plurality of radio resources based on the further indication of interference mitigation, wherein the second set of radio resources comprises resources for which each of the determined interference is less than each of the determined interference of the first set of radio resources.

11. The radio network node of claim 10, wherein the processing circuit is configured to select the first set of radio resources such that interference on each radio resource of the first set of radio resources is above a second threshold value for interference.

12. The radio network node of claim 11, wherein the second threshold value is dependent on the indication of interference mitigation for the user equipment.

13. The radio network node of claim 10, wherein the processing circuit further is configured to determine a measure of channel quality based on the indication of interference mitigation.

14. The radio network node of claim 13, wherein the processing circuit further is configured to perform link adaptation based on the measure of channel quality.

15. The radio network node of claim 10:
wherein the processing circuit further is configured to:
obtain a further indication of interference mitigation in a further receiver in a further user equipment;
select, based on the further indication of interference mitigation, a further set of radio resources, from amongst the plurality of radio resources, for a further transmission from the radio base station to the further user equipment; and
wherein the radio network node further comprises a transmitter configured to send further scheduling information indicating the further set of radio resources to the further user equipment.

16. The radio network node of claim 15:
wherein the indication of interference mitigation is greater than the further indication of interference mitigation; and
wherein the processing circuit further is configured to select a second set of radio resources from amongst the plurality of radio resources based on the further indication of interference mitigation, wherein the second set of radio resources comprises resources for which each of the determined interference is less than each of the determined interference of the first set of radio resources.

17. The radio network node of claim 10, wherein the transmitter further is configured to send scheduling information indicating the first set of radio resources to the user equipment.

18. The radio network node of claim 10, wherein the radio network node either:
further comprises a receiver configured to obtain the indication of interference mitigation from the user equipment.

19. A method, in a radio network node, for scheduling a transmission from the radio network node to a user equipment, the method comprising:
obtaining, by the radio network node, an indication of interference mitigation in a receiver comprised in the user equipment, wherein the indication is indicative of a level of interference mitigation, and wherein the indication of interference mitigation is greater than the further indication of interference mitigation obtained from a further receiver in a further user equipment;
determining, by the radio network node, whether the indication of interference mitigation is above a first threshold value for interference mitigation;
determining, by the radio network node, a level of interference on each of a plurality of radio resources;
obtaining, from the user equipment, a first set of measures and a second set of measures, wherein the first set of measures relates to a signal received by the user equipment and the second set of measures relates to the same signal, wherein the first set of measures is obtained by the user equipment prior to processing of the signal in the receiver, and wherein the second set of measures is obtained by the user equipment after processing of the signal in the receiver;
determining the indication of interference mitigation based on the first set of measure and the second set of measure; and
selecting, by the radio network node, a first set of radio resources, from amongst the plurality of radio resources, for the transmission based on the determination whether the indication of interference mitigation in the receiver is above the first threshold value and the level of interference on each of the plurality of radio resources, thereby scheduling the transmission, selecting a second set of radio resources from amongst the plurality of radio resources based on the further indication of interference mitigation, wherein the second set of radio resources comprises resources for which each of the determined interference is less than each of the determined interference of the first set of radio resources.

* * * * *